United States Patent [19]

Johnson

[11] Patent Number: 4,740,158
[45] Date of Patent: Apr. 26, 1988

[54] RADIANT ENERGY DRYING OVEN WITH FUME INCINERATION FEATURE

[75] Inventor: Arthur C. W. Johnson, Troy, Mich.

[73] Assignee: Combustion Research Corporation, Pontiac, Mich.

[21] Appl. No.: 7,504

[22] Filed: Jan. 28, 1987

[51] Int. Cl.$^4$ .............................................. F27B 9/28
[52] U.S. Cl. .................................... 432/59; 432/175; 432/176; 432/121
[58] Field of Search ............... 432/175, 176, 177, 121, 432/8, 59; 126/92 AC; 431/326, 347

[56] References Cited

U.S. PATENT DOCUMENTS

| | | | |
|---|---|---|---|
| 3,100,632 | 8/1963 | Mohring | 432/176 |
| 3,109,877 | 11/1963 | Wilson | 432/176 |
| 3,248,099 | 4/1966 | Bratko | 432/175 |
| 3,825,407 | 7/1974 | Fujite et al. | 432/175 |
| 3,868,212 | 2/1975 | Lemaire | 432/175 |
| 3,914,097 | 10/1975 | Wurl | 432/59 |
| 3,920,383 | 11/1975 | Kerr | 432/175 |
| 4,059,399 | 11/1977 | Cellier et al. | 432/121 |
| 4,295,826 | 10/1981 | Vasilantone | 432/175 |
| 4,589,843 | 5/1986 | Smith | 432/59 |
| 4,600,378 | 7/1986 | Fujita et al. | 432/8 |
| 4,662,840 | 5/1987 | Ellison | 432/59 |
| 4,664,618 | 5/1987 | Gitman | 432/177 |

Primary Examiner—Henry C. Yuen
Attorney, Agent, or Firm—Krass & Young

[57] ABSTRACT

An indirect-fired, infrared drying oven for articles of manufacture which have been through a coating process. Tubular radiators are mounted within the enclosure to produce infrared radiation which impinges upon the coated articles. The tubular radiator operates at a sub-ambient interior pressure and is vented near the burner to directly inspirate fumes from the interior of the oven as they are given off by the drying articles. Temperatures in the radiator are sufficient to incinerate the fumes as they travel along the length of the tubular radiator. A heat exchanger is utilized near the exhaust end of the radiator to recover waste heat and return this heat to the oven enclosure, thus balancing air flow within the enclosure and maintaining a neutral pressure condition.

14 Claims, 2 Drawing Sheets

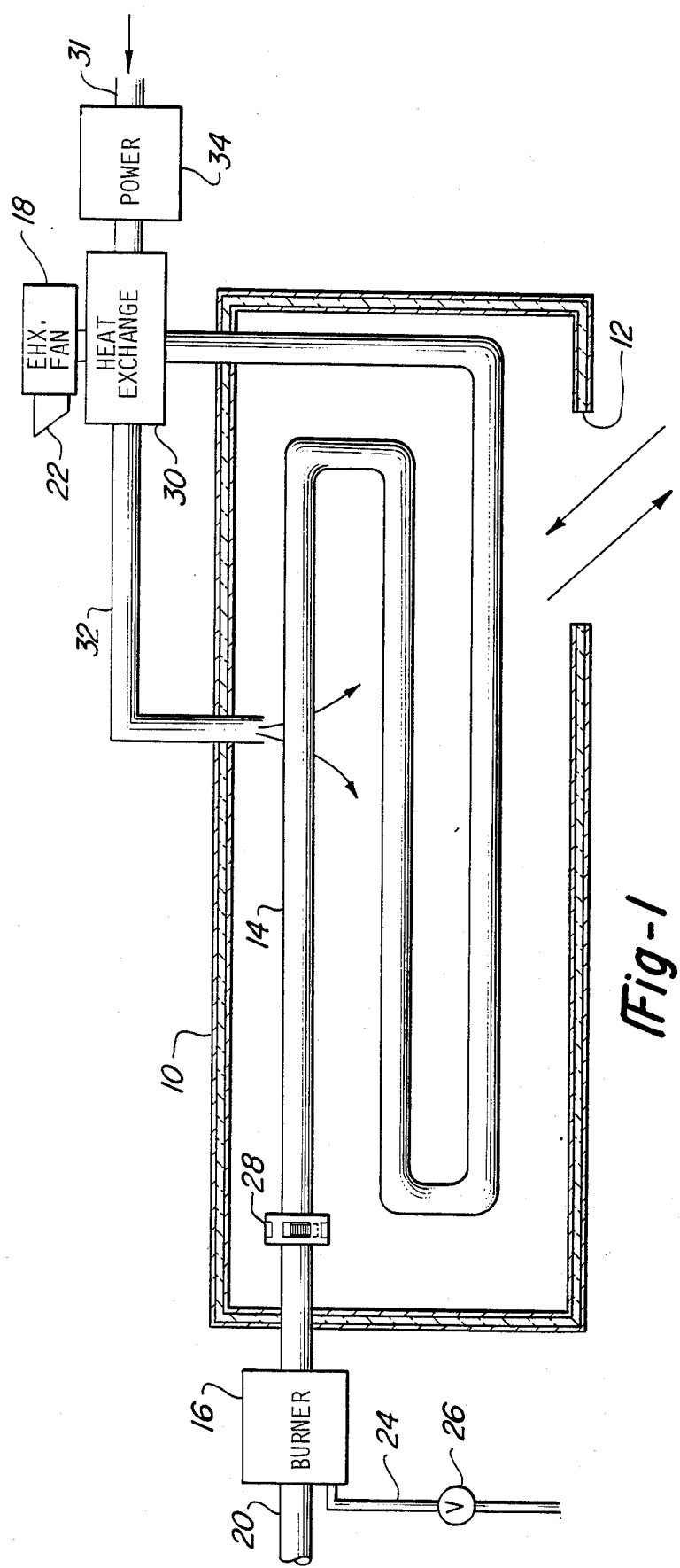
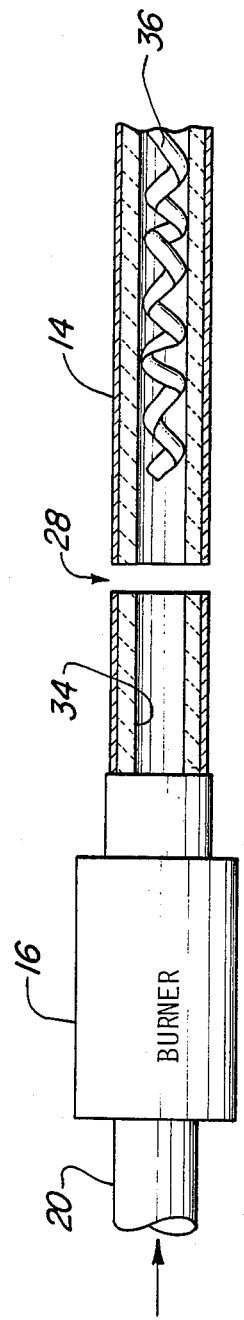
Fig-1
Fig-2

RADIANT ENERGY DRYING OVEN WITH FUME INCINERATION FEATURE

INTRODUCTION

This invention relates to ovens for treating articles of manufacture such as by baking the articles or drying article coatings, and particularly to an oven having a fume incinerating feature.

BACKGROUND OF THE INVENTION

It is well-known that various articles of manufacture require or benefit from a heating or baking step during manufacture thereof. For example, many articles coated with as paint and/or other protective coatings are thereafter dried and/or cured in large ovens prior to final assembly and/or shipment. Such ovens are typically heated with hot air which flows into and out of the oven enclosure by means of ducts. It is common to heat by direct-firing, meaning that the products of the heat-producing combustion are injected directly into the oven air supply. Devices such as fans are often used to circulate air within the oven enclosure to equalize temperatures throughout the oven and to reduce the risk of explosion.

As the articles or the coatings on the articles within the oven dry, they typically release combustible and odiferous fumes which, if allowed to accumulate, may eventually cause the atmospheric composition with the oven enclosure to exceed tolerable levels or even to become explosive. To prevent this occurrence, the fume-laden atmosphere of the oven enclosure is cleared by means of an exhaust fan and diluted or replaced with fresh air. Even with partial recirculation, this gives rise to an increase in fuel comsumption to maintain a desired temperature level, and creates the potential for atmospheric pollution.

Even with the use of an exhaust system, the presence of corrosive fumes and high humidity from direct-fired heating within the oven enclosure can cause the inner liner and insulation of the oven enclosure to deteriorate rapidly. This deterioration, in turn, can produce the introduction of particulate contaminants into the oven enclosure, which contaminants can adversely effect the quality of the finish of the drying articles, especially if the particulate matter becomes airborne as a result of air currents within the oven enclosure. Filters in recirculation paths may, of course, be installed but installation and maintenance of filters add to cost.

SUMMARY OF THE INVENTION

The present invention is an oven, the primary purpose of which may be to treat articles of manufacture through the production of heat by an indirect-fired generator. In addition, the invention provides means for directly inspirating into the generator the fumes which are produced in the oven enclosure as a result of the article treatment process.

In the preferred embodiment of the invention, hereinafter described in detail, the generator is an infrared emitter and takes the form of a metal tube which is charged with a high temperature effluent by a fuel-fired burner. The burner preferably receives relatively clean air from outside the oven enclosure, either at room temperature or preheated, mixes the air with an appropriate fuel such as natural gas, propane or fuel oil, and produces a high temperature effluent which is introduced into the tube. The effluent travels over the length of the tube, such travel being induced by sub-ambeant pressure in the tube, causing the tube to be heated and to emit infrared radiation. This infrared radiation can be directed by reflective panels or by the oven enclosure itself toward the articles in drying or baking locations within the oven enclosure. The tubular radiator is constructed to exhibit a secondary inlet downstream of the burner but sufficiently close to the burner to be associated with a very high effluent temperature to inspirate fume-laden air from the oven enclosure into the tubular infrared radiator. Where the fumes contain oxidizable hydrocarbons, the resulting effluent temperature; i.e., the temperature of the effluent which is the result of the mixtures of primary effluent and inspirated air, is at least 1450° F. thereby to oxidize the hydrocarbon component of the fumes in the radiator.

Also in the preferred form of the invention hereinafter described in detail, heat exchanger means are provided near the outlet or exhaust end of the tubular radiator to recover heat from the incinerated effluent before it is discharged into the atmosphere. In addition, means are provided for returning the recovered heat from the heat exchanger to the enclosure thereby to supplement the heat produced by infrared radiation.

Also part of the preferred embodiment in an insulative tubular radiator liner of material such as "Fibrefrax" to establish a time, temperature and turbulence dwell time of the effluent to effect the complete oxidation process of the effluent.

As will be apparent to those skilled in the art, the apparatus of the invention may be utilized and the advantages of the invention may be realized in various combinations, with or without supplementary devices such as mixing fans within the heated enclosure.

According to a second aspect of the invention, an indirect-fired oven with an integral fume-incineration feature is provided. In general, the combination includes a burner, means forming a combustion chamber for the burner, means to transfer heat from the combustion process to the oven enclosure, means to inspirate fume-laden air from the oven enclosure directly into the combustion chamber where such fumes are oxidized, and means for adding sufficient preheated air to the oven enclosure to compensate for the fume inspiration and maintain a neutral pressure condition in the oven enclosure.

BRIEF DESCRIPTION OF THE DRAWING

FIG. 1 is a side view partly in section of a schematicized oven having infrared heating with fume inspiration;

FIG. 2 is a side view partly in section of a portion of the tubular radiator from the system of FIG. 1 showing the interior details thereof;

DETAILED DESCRIPTION OF THE ILLUSTRATIVE EMBODIMENT

Figure 3:
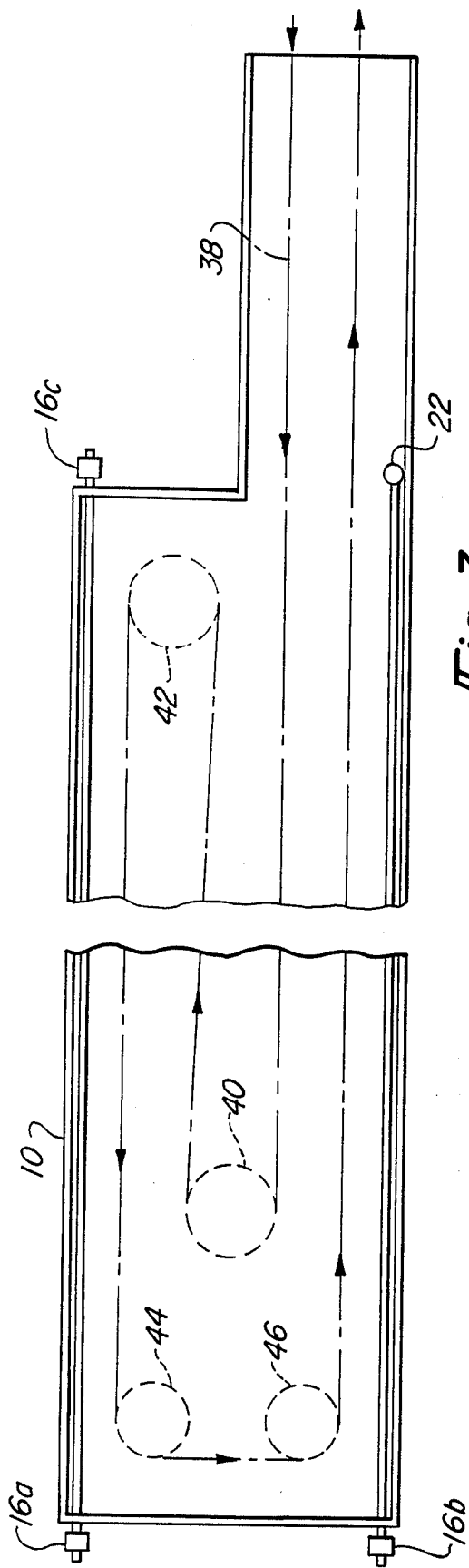
FIG. 3 is a plan view of a representative oven.

Referring to FIG. 1, a double-wall, insulated oven enclosure 10 has a lower opening 12 adjacent the right-hand bottom end for admitting and discharging coated articles by means of a suitable conveyor system. Although shown in section, it is to be understood that the oven enclosure 10 fully encloses the interior volume on all sides, both ends, top and bottom, except for the opening 12 through which the articles or parts are admitted and discharged.

Running through the interior of the oven enclosure 10 and adjacent parts drying locations, there is a tubular metal radiator 14 having an inlet end which is connected to a gas-fired burner 16 and an exhaust end which is connected to an exhaust fan 18 which produces a sub-ambient pressure condition in the tube 14 thereby effectively drawing the effluent produced by burner 16 through the tube. Both the air inlet 20 to the burner 16 and the exhaust hood 22 of the tubular radiator 14 are outside of the oven enclosure 10 and a filter may be employed to ensure a clean air flow for combustion.

The burner may be any of several available types and may be arranged and equipped to burn various types of fuels such as oil, natural gas, liquid petroleum and/or combinations thereof. A family of preferred burners is available from the Combustion Research Corporation of Pontiac, Mich.

In the instant embodiment, burner 16 receives natural gas through a supply line 24 having a control valve 26 located therein. The burner 16 is capable of producing an effluent of approximately 2000° F. which is introduced into the tubular radiator 14 and caused to travel over the length of the radiator toward the exhaust 22 by the fan 18. As a result, the tubular radiator 14 is heated to a temperature which it emits infrared radiation toward the articles of manufacture which have been placed in the oven enclosure 10 after the coating process for the purpose of drying and/or curing the coating on the articles.

Tubular radiator 14 is provided with an adjustable or fixed fume inspirator 28 which forms a secondary inlet to the tubular radiator 14 just downstream of the burner 16 where the temperature of the effluent from the burner 16 is in the 2000° F. range. Because the inspirator means 28 is within the oven enclosure 10, and the pressure within the tube 14 is less than the ambient pressure in oven 10, the atmosphere of the oven enclosure 10, including fumes given off by the drying coatings on the articles of manufacture, is inspirated into tube 14 through vent holes in inspirator 28. The temperature of the combined or mixed effluent downstream of the inspirator means 28 is preferably at least 1450° F. thereby to support continued oxidization and incineration of the oxidizable, hydrocarbon components of the inspirated fumes.

In the embodiment shown in FIG. 1, the effluent from the tubular radiator 14 eventually drops to a temperature of approximately 650° F. Because of this gradual reduction in temperature over the length of tubular radiator 14, it is possible to create "build", hold and cool down zones within the oven enclosure 10 as will be apparent to those skilled in the art.

Before exhausting the 650° F. incinerated effluent to the atmosphere, the effluent is passed through the heat exchanger 30 where a substantial portion of the heat in the effluent is recovered. This recovered heat is returned to the oven enclosure 10 by means of a cross flow conduit having an inlet 31 which is outside of the oven enclosure 10 and a return line 32 which terminates within the oven enclosure 10, as air flow being created by blower 34. Although shown in highly simplified form near the top of the enclosure 10, it is to be understood that the discharge of the recovered heat into the oven 10 for the purpose of supplementing the radiation heat may be carried out by means of a duct system and may involve the distribution of heated air throughout the enclosure according to a formulated plan. In the embodiment shown, outside air at 0° F. is heated by the recovered heat to approximately 450° F. or oven operating temperature where it is mixed in with the existing 450° F. air in the oven enclosure 10. The incinerated effluent is exhausted from the oven at a temperature of approximately 200° F. above oven operating temperature (600° F.). Heat exchanger 30 reduces actual exhaust temperature to about 300° F. More than one heat exchanger can be used. A suitable cross-flow, plate type heat exchanger is Exothermics-Eclipse Model No. 5000 SP 74 HT-IU available from Eclipse, Inc. of Toledo, Ohio, 43612.

Because the system shown in FIG. 1 is indirect fired; i.e., the products of combustion from burner 16 are contained as an effluent within the tubular radiator 14 and are not released into the atmosphere of the oven enclosure 10, humidity levels in the oven enclosure 10 can be maintained very low, thus dramatically reducing corrosion and deterioration of the internal liner of the oven enclosure 10 and reducing the quantity of gases that need to be treated. The rapid inspiration of the fumes which are given off by the drying and/or curing process into the tubular radiator 14 by means of the inspirator means 28 maintains the operation of the system in an essentially smokeless state; i.e., whatever particulate matters or potential condensates which are released into the atmosphere of the furnace are maintained in the gaseous state by the infrared component and can be quickly evacuated by inspirator means 28. Moreover, the fumes are incinerated by the high temperatures of the effluent within the combustion chamber portion of the radiator 14 which is near the burner 16 such that the discharge to the atmosphere by way of exhaust 22 meets accepted environmental control levels. Since there are no condensates, there is virtually no odor.

It is highly desirable that air flow quantities must be balanced in the system of FIG. 1 so that there is little or no air exchange between inside and outside the oven 10 via opening 12. This can be achieved by approximately equalizing the flow rates of the air inspirated at means 28 with the air discharged back into the oven 10 by conduit 32.

Referring to FIG. 2, a detail of the interior construction of the tubular radiator 14 adjacent the burner 16 is shown. In this drawing, the inspirator means 28 is shown schematically as a break in the tubular radiator 14.

FIG. 2 illustrates the use of an insulative sleeve 34 within the tubular radiator 14 immediately downstream of the burner outlet and for up to about 40 feet downstream of the inspirator means 28. The sleeve may be constructed of various materials such as ceramic or Fiber-frax, a material manufactured by Carborundum Company, a subsidiary of Sohio, Inc. In a typical example, the length of the liner 34 is 20 to 40 feet. The use of the liner 34 permits the operation of the burner 16 at a sufficiently high output level to produce an effluent at temperatures of approximately 2000° F. so that the mixture of the effluent with heated atmospheric, fume-bearing effluent from the oven enclosure 10 produces a resulting temperature of at least 1450° F. to promote efficient and effective incineration. Moreover, the liner 34 reduces the temperature of the surrounding tube 14 to about 700° F. and prevents rapid oxidation of the tube 14 and permits the use of lighter, less expensive materials of construction. In a typical example, the burner 16 takes in air through inlet 20 at approximately 28 cubic feet per minute. The inspirator means 28 takes in approximately 25 cubic feet of air per minute.

FIG. 2 also illustrates the use of a twisted turbulator strip 36 within the end section of the tubular radiator 14. The purpose of the turbulator strip 36 is to increase turbulence and contact time between the effluent and the hot liner in the primary oxidation area. A similar result can be achieved by means of elbows in the radiator 14.

Figure 4:
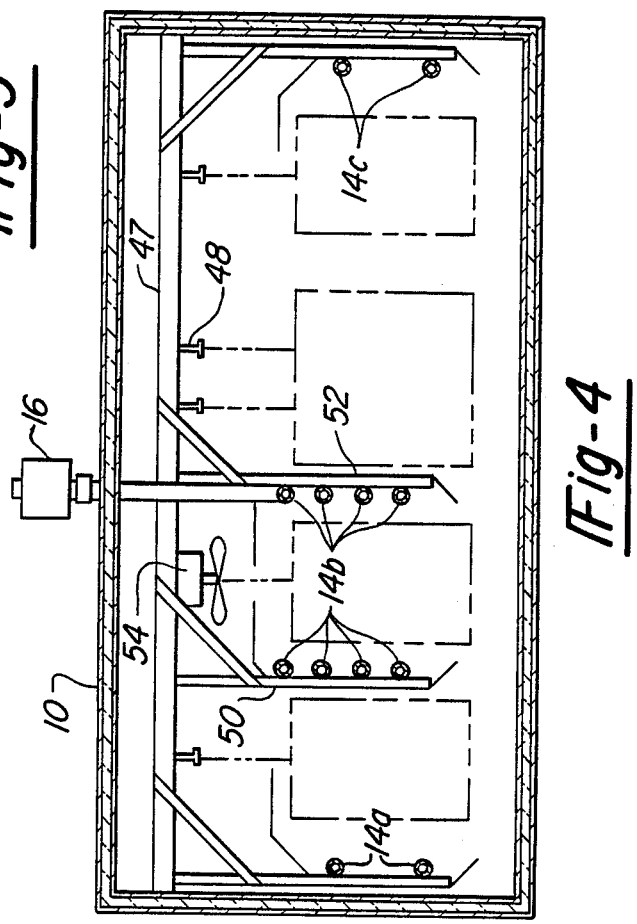
FIG. 4 is an end view, partly in section, of the oven of FIG. 3.

Referring now to FIGS. 3 and 4, a typical installation of the invention utilizing multiple burners and multiple tubular radiators which are manifolded together to produce a reduced exhaust configuration will be described.

Looking first to FIG. 3, the oven 10 is shown in plan view to accommodate a four-legged article run 38 representing the path of an overhead conveyor 49 (FIG. 4). The conveyor run 38 goes around a bull wheel 40 after passing through a warm-up zone, doubles back on itself to a second bull wheel 42, continues around bull wheels 44 and 46 to a cool-down zone, and ultimately exits the oven 10 in approximately the same location as it entered.

As shown in the cross-sectional view of FIG. 4, the oven 10 is provided with internal structure 47 to support the conveyor 48. Tubular radiators 14a, 14b and 14c are stategically located relative to the four parts runs, the parts run associated with tubes 14b obviously being the principal drying run as indicated by the large number of parallel, spaced radiators mounted on the adjacent reflective wall panels 50 and 52. In this build area of the oven 10, the intensity of infrared radiation is the greatest. An overhead fan 54, or the like, may be utilized to produce moderate air movement within the hold zone of oven 10 for the purpose of producing an even temperature distribution and faster cool down of parts when required. Although only a single burner 16 is shown, it is to be understood that a plurality of burners, shown in FIG. 3 at 16a, 16b and 16c will be used. The exhaust systems, on the other hand, will typically be manifolded wherever possible to reduce the number of exhaust fans 18 and heat exchangers 30 which are required. In a typical oven, the heat "build" zone is of such length that the articles being conveyed through the oven spend about one quarter to one third of the total excursion time therein, the balance of the excursion time is in a high heat or "hold" zone.

A major operating benefit of the illustrated embodiment, as applied to the drying of surface coatings, lies in the fact that the infrared component emitted by tube 14 heats the fumes from the coating and prevents the fumes from condensing on the cooler surface of the articles with a corresponding degradation in the finish.

However, the principal advantages of the present advantages of the present invention; i.e., indirect firing, and inspiration of fumes from the oven enclosure into an oxidation zone immediately downstream of the heat producing burner can actually be achieved without making direct use of the infrared component. For example, ducts may be used to establish a forced air path through the oven enclosure and the tube 14 may be caused to pass through the duct or through a heat exchanger in the duct outside of the oven enclosure. The fume inspirator 28 thus lies within the duct to inspirate recirculating, fume laden air from the oven enclosure and oxidize it within the tube but at a downstream location. As with the illustrated embodiment, air is pulled through the tube by a power exhaust fan located at the output end of the tube.

It is believed that operation of the illustrated embodiment is apparent from the foregoing but a brief description of operation is hereinafter given.

Assuming the oven enclosure 10 is started up from a cold condition, the exhaust fan 18 is started to produce a pre-purge operation whereby air is drawn from a clean source through inlet 20, burner 16 and tube 14 for a period of time sufficient to ensure that explosion potential is eliminated. After the pre-purge cycle has timed out, valve 26 is opened and the mixture of fuel and air in burner 16 is ignited while fan 18 continues to run.

The conduit 32 may also be pre-purged by initiating operation of blower 34 at the same time as fan 18 is actuated. This has the advantage of purging the entire system before initiation.

After the liner 34 and the unlined portion, if any, of the tubular radiator 14 has achieved peak operating temperatures, the articles to be treated are conveyed through the oven in a manner which will be apparent to those skilled in the art. It should be noted that these articles, although described herein as articles which have been coated and which, therefore, require a drying operation, may also include baked goods and other articles of manufacture which are processed by the application of heat and/or radiant energy.

After the run is completed and it is desirable to shut the oven 10 down, valve 26 is closed and the fans 18 and 34 continue to run for a post-purge operation, the length of which would also be set by an appropriate timer.

I claim:

1. An infrared radiation oven for indirect heat treating of articles comprising:
    an oven defining an enclosure within which the articles may be placed for treatment;
    at least one tubular radiator extending through at least a portion of said enclosure adjacent the treatment locations of one or more articles for radiating infrared energy to said articles, said tubular radiator having an inlet end and an exhaust end;
    burner means connected to said inlet end to introduce products of combustion as a high temperature effluent into said tubular radiator;
    exhaust means for producing a sub-ambient pressure condition in the radiator; and
    a secondary inlet in said radiator downstream of said burner but within the enclosure for inspirating fumes from said oven enclosure directly into said radiator.

2. Apparatus as defined in claim 1 wherein said fumes include a hydrocarbon component and the burner means is chosen to produce and maintain an efflucent temperature at said secondary inlet sufficient to oxidize the hydrocarbon component.

3. Apparatus as defined in claim 1 further including heat exchanger means associated with said radiator adjacent said exhaust end for recovering heat from the effluent; and
    means for returning recovered heat to said oven enclosure to supplement heat produced by infrared radiation.

4. Apparatus as defined in claim 3 wherein air pressure in the oven enclosure is neutralized by balancing of the flow rates of the inspirator means and the heat return means.

5. Apparatus as defined in claim 1 further including an insulative liner disposed within said tubular radiator over at least a portion of the length thereof adjacent said burner means.

6. Apparatus as defined in claim 1 further including turbulator means within at least a portion of said tubular radiator.

7. Apparatus as defined in claim 1 further including infrared radiation reflective panels adjacent at least a portion of said tubular radiator for directing infrared radiation toward said article locations.

8. An infrared oven for treating articles comprising:
means defining an oven enclosure within which said articles may be placed for treatment;
a plurality of tubular radiators extending through at least a portion of said oven enclosure and arranged around article treatment locations, each of said tubular radiators having an inlet end and an exhaust end;
a plurality of burners connected to the inlet ends of respective tubular radiators to introduce products of combustion into said tubular radiators as a high temperature effluent;
power exhaust means for creating a sub-ambient pressure condition in said radiators; and
means downstream of said burners but within the enclosure forming, in at least one of said radiators, a secondary inlet for inspirating fumes from said oven enclosure directly into said one radiator and causing said fumes to mix with said effluent and flow toward said exhaust end.

9. Apparatus as defined in claim 8 wherein said fumes include an oxidizable component and the burners are selected to produce in said same radiators a temperature adjacent said secondary inlets sufficient to oxidize the hydrocarbon components of said fumes.

10. Apparatus as defined in claim 8 further including heat exchanger means associated with the exhaust ends of at least some of said tubular radiators for recovering heat from the effluent therein; and
means for returning recovered heat to the oven enclosure to supplement heat provided by infrared radiation.

11. Apparatus as defined in claim 8 further including insulator liner means in at least a portion of some of said tubular radiators.

12. Apparatus as defined in claim 8 wherein said oven enclosure further includes reflective panels disposed adjacent at least a portion of said tubular radiators for directing infrared radiation toward the articles to be dried within said oven enclosure in said drying locations.

13. An oven for treating articles comprising:
an oven defining an enclosure within which the articles may be placed for treatment;
a burner;
means defining a combustion chamber for said burner;
means for indirectly deriving heat from said combustion chamber and transferring said heat to the air in said oven enclosure;
secondary inlet means in said combustion chamber downstream of said burner for inspirating into said combustion chamber fume laden air from said oven enclosure whereby said fume laden air is incinerated in said combustion chamber by high temperature operation of said burner; and
means for supplying air to said enclosure to compensate for air inspirated into said combustion chamber.

14. Apparatus as defined in claim 13 including means for recovery waste heat from said combustion chamber and adding said recovered heat to the compensation air supplied to said enclosure.

* * * * *